«12» United States Patent
Gut

(10) Patent No.: US 10,414,326 B2
(45) Date of Patent: Sep. 17, 2019

(54) ILLUMINATION DEVICE

(71) Applicant: AUDI AG, Ingolstadt (DE)

(72) Inventor: Carsten Gut, Überlingen (DE)

(73) Assignee: AUDI AG, Ingolstadt (DE)

( * ) Notice: Subject to any disclaimer, the term of this patent is extended or adjusted under 35 U.S.C. 154(b) by 111 days.

(21) Appl. No.: 15/374,323

(22) Filed: Dec. 9, 2016

(65) Prior Publication Data
US 2017/0175969 A1   Jun. 22, 2017

(30) Foreign Application Priority Data
Dec. 11, 2015 (DE) .................. 10 2015 016 048

(51) Int. Cl.
F21S 41/675    (2018.01)
B60Q 1/08      (2006.01)
F21S 41/14     (2018.01)
F21S 41/147    (2018.01)
F21S 41/20     (2018.01)
F21S 41/36     (2018.01)
F21S 41/40     (2018.01)
F21S 45/10     (2018.01)

(52) U.S. Cl.
CPC ............ B60Q 1/08 (2013.01); F21S 41/14 (2018.01); F21S 41/147 (2018.01); F21S 41/285 (2018.01); F21S 41/36 (2018.01); F21S 41/40 (2018.01); F21S 41/675 (2018.01); F21S 45/10 (2018.01)

(58) Field of Classification Search
CPC ........ F21S 41/675; F21S 41/14; F21S 41/147; F21S 41/36; F21S 45/10; F21S 41/40; F21S 41/285; B60Q 1/08
See application file for complete search history.

(56) References Cited

U.S. PATENT DOCUMENTS

| 5,938,319 A | 8/1999 | Hege |
| 6,660,964 B1 * | 12/2003 | Benderly ........... B23K 26/0624 |
| | | 219/121.68 |
| 2004/0218401 A1 | 11/2004 | Okubo et al. |
| 2015/0160454 A1 | 6/2015 | Bhakta |
| 2015/0176792 A1 | 6/2015 | Hager et al. |

(Continued)

FOREIGN PATENT DOCUMENTS

| DE | 195 30 008 A1 | 2/1899 |
| DE | 197 37 653 A1 | 3/1999 |

(Continued)

*Primary Examiner* — Y M. Lee
(74) *Attorney, Agent, or Firm* — Seed IP Law Group LLP

(57) ABSTRACT

An illumination device is provided having a light source, a light exit aperture, and a reflector unit that is arranged between the light source and the light exit aperture and can be controlled in terms of its reflection position by means of a control signal, wherein the reflector unit is designed to assume (via an operating control signal) an operating position in which light emitted by the light source can be deflected to the light exit aperture, and wherein the illumination device has an absorber element which is designed to absorb received light, wherein the reflector unit is designed to assume (via an absorber signal) an absorber position in which the light emitted by the light source and/or light entering into the illumination device from the outside through the light exit aperture can be deflected to the absorber element.

9 Claims, 1 Drawing Sheet

(56) References Cited

U.S. PATENT DOCUMENTS

| | | | |
|---|---|---|---|
| 2016/0033102 A1* | 2/2016 | Hiratsuka | F21S 48/1705 |
| | | | 362/466 |
| 2016/0033112 A1* | 2/2016 | Weissenberger | F21V 9/16 |
| | | | 362/510 |
| 2016/0153634 A1* | 6/2016 | Albou | F21V 14/00 |
| | | | 362/509 |

FOREIGN PATENT DOCUMENTS

| | | |
|---|---|---|
| DE | 101 34 594 A1 | 1/2003 |
| DE | 10 2008 022 795 A1 | 11/2009 |
| DE | 10 2014 213 636 A1 | 1/2015 |
| DE | 10 2013 226 639 A1 | 6/2015 |
| DE | 10 2014 001 201 A1 | 7/2015 |
| EP | 1 433 655 A2 | 6/2004 |
| JP | 2015-64963 A | 4/2015 |
| JP | 2015-123855 A | 7/2015 |
| WO | 2013/164276 A1 | 11/2013 |

* cited by examiner

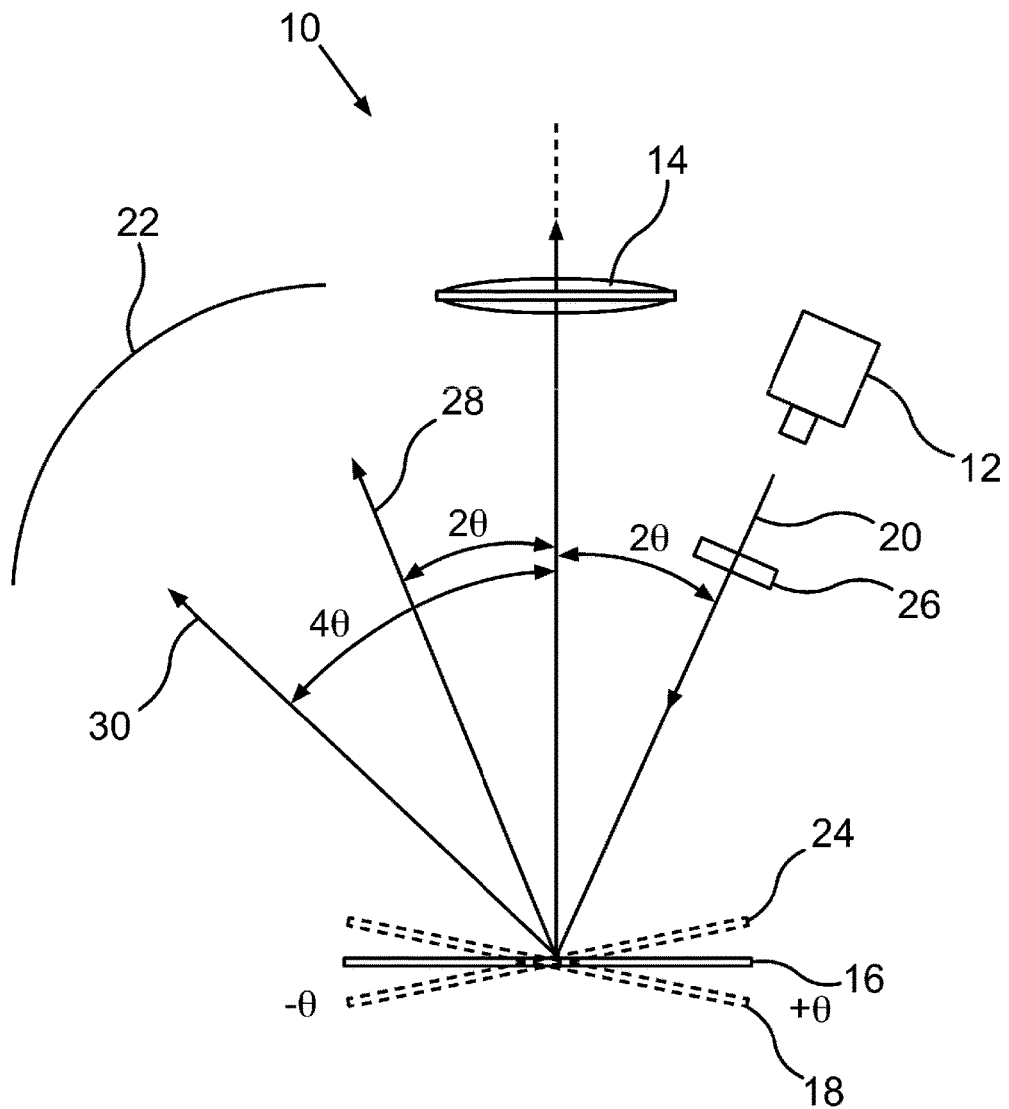

ILLUMINATION DEVICE

BACKGROUND

Technical Field

The invention relates to an illumination device having a light source, a light exit aperture, and a reflector unit arranged between the light source and the light exit aperture, which reflector unit can be controlled with regard to its reflection position by means of a control signal, wherein said reflector unit is designed to assume—by means of an operating control signal—an operating position in which light emitted by the light source can be deflected to the light exit aperture. The invention also relates to a headlight for a motor vehicle, having a headlight housing as well as an electrical connection unit. In addition, the invention relates to a motor vehicle. Finally, the invention also relates to a method for operating an illumination device having a light source, a light exit aperture, and a reflector unit arranged between the light source and the light exit aperture so as to be adjustable, wherein the reflector unit is controlled with regard to its reflection position by means of a control signal, wherein said reflector unit assumes—by means of an operating control signal—an operating position in which light emitted by the light source is deflected to the light exit aperture.

Description of the Related Art

Genetic illumination devices, headlights with such illumination devices, as well as motor vehicles having headlights and methods for their operation are fundamentally known, for example from DE 197 37 653 A1, which discloses an illumination device for vehicles and an operating method for such an illumination device; DE 101 34 594 A1, which discloses an illumination system and an illumination method; DE 10 2008 022 795 A1, which discloses a motor vehicle headlight; DE 10 2013 226 639 A1, which discloses the generation of a light beam pattern in a far field; and DE 10 2014 001 201 A1, which discloses an illumination device for a motor vehicle with two types of illumination devices.

BRIEF SUMMARY

Although the prior art has essentially proven itself, it turns out to be disadvantageous that the light source is externally visible given a deactivated illumination device or deactivated headlight. In particular if the light source comprises a semiconductor laser that interacts with a conversion unit to generate the desired light, which conversion unit has a conversion element, a conversion material of the conversion element can be externally visible. If the conversion material of the conversion element is formed by phosphor, the illumination device or the headlight appears from the outside such that a yellowish gleam is perceptible. This is perceived as objectionable. Moreover, an aging of structural elements of the illumination device or of the headlight may be intensified by light (in particular sunlight) entering from the outside via the light exit aperture, especially if the illumination device comprises a conversion unit.

Therefore, given a generic illumination device, a method for its operation, a headlight and a motor vehicle, it is the object of the invention to reduce unwanted effects due to light entering from the outside through the light exit aperture.

An illumination device is proposed as an achievement with an embodiment of the invention. Respectively, a headlight, a motor vehicle and a method for operation of the illumination device are also proposed according to other embodiments.

Additional advantageous embodiments of the invention result using features of the dependent claims.

In particular, given a generic illumination device it is proposed with the invention that an absorbing element be provided which is designed to absorb received light, wherein the reflector unit is designed to assume—by means of an absorber signal—an absorber position in which the light emitted by the light source and/or light entering from outside into the illumination device through the light exit aperture can be deflected to the absorber.

Furthermore, with the invention it is proposed in particular that a generic headlight comprise an illumination device of the invention.

Furthermore, it is proposed in particular that a generic motor vehicle comprise a headlight according to the invention.

Finally, given a generic method it is proposed in particular with the invention that the reflector unit assume—by means of an absorber signal—an absorber position in which the light emitted by the light source and/or light entering from the outside into the illumination device through the light exit aperture is deflected to an absorber element which absorbs received light.

The invention utilizes the reflector unit (which is normally present anyway in the illumination device) in order to advantageously act in order to interrupt a beam path between the light exit aperture and the light source in the deactivated state of the illumination device. With the absorber element, it is thereby ensured that unwanted light radiation (due to a deflection or reflection within the illumination device) may cause no additional unwanted effect, because this radiation is absorbed in the absorber element. For example, the absorber element may be formed in that a black surface, a light-absorbing (in particular black) hollow body and/or the like whereby the light radiation may be absorbed is provided in the region of the absorber position. For example, it may be provided that a housing of the illumination device or of the headlight is blackened in the absorber region. Additional absorption means for light radiation may also be provided.

The light source is preferably an electrical light source that, for example, may comprise a laser (in particular a semiconductor laser); a light-emitting diode (in particular a matrix arrangement of a plurality of light-emitting diodes); a xenon lamp; and/or the like. The light exit aperture is an aperture that is provided by the illumination device and that serves for the exit of the light provided by the light source in the activated state of the illumination device. For example, the light exit aperture may be formed by a housing or the like. Moreover, the light exit aperture may also be formed by a material that is transparent to emitted light, in order to protect the illumination device (for example a housing of the illumination device) against external effects.

The illumination device also comprises the reflector unit, which can be controlled (in terms of its reflection position) by means of the control signal. It is thereby possible to be able to adjust illumination properties of the illumination device as desired given an activated illumination device. For example, the reflector unit may be formed by an adjustable mirror that is designed so as to be adjustable in terms of its position (in particular a pivot position) by means of an actuator. The control signal may be provided by a control unit that is itself comprised by the illumination device.

Moreover, the possibility naturally exists to realize the control unit at least in part (or even entirely) by a central control unit, for example a headlight controller, a motor vehicle controller or the like. For example, a headlight for a motor vehicle may thereby be switched between "high beams" and "dipped beams" by means of the reflector unit. The operating position is accordingly a position with which a connection is optically established between the light source and the light exit aperture. Accordingly, an operating control signal is produced by the control unit as a control signal by means of which the desired reflection position may be set as an operating position in the reflector unit. In this operating position, the light emitted by the light source can be deflected to the light exit aperture so that the desired illumination coulisse may be generated.

The absorber position in which an optical connection between the light source and the light exit aperture is directly avoided or interrupted differs from this operating position. This is achieved in that the reflector unit is adjusted, with regard to its reflection position, such that light emitted by the light source would not reach the light exit aperture insofar as the light source were activated. It may thereby be simultaneously achieved that light, for example sunlight, entering from the outside through the light exit aperture may not reach the light source. Light entering from the outside into the absorber position may be deflected by the reflector unit into the absorber element. At the same time, it is thereby also ensured that the light source and units or elements interacting with it (said units or elements being arranged between the light source and the reflector unit) are no longer externally visible. Light entering from the outside thus can no longer affect the elements or units acting inclusively between the reflector unit and the light source.

It is also proposed that the reflector unit be designed to automatically assume the absorption position if the light source is deactivated. The assumption of the absorber position may thereby be provided actively or also passively. It may thus be provided that the reflector unit is activated accordingly due to a deactivation signal for the light source, and that the reflector unit is driven actively (by means of an actuator, for example) into the absorber position. The reflector unit is thus still supplied with power given a deactivated light source, in order to be able to produce the desired setting. However, it may also be provided that the reflector unit is deactivated together with the light source, whereupon the reflector unit then automatically passively assumes the absorber position.

For example, it may be provided that the reflector unit is designed to be driven into the absorber position by means of an actuator unit. This embodiment thus realizes an active assumption of the absorber position. It may thus be provided that the actuator unit possesses a separate power supply, or is only automatically deactivated after assumption of the absorber position by the reflector unit. Given deactivation of the light source, it may thereby be ensured that the reflector unit may be driven into the absorber position by means of the actuator unit. For this purpose, the actuator unit may, for example, be an electromotive actuator unit that, for example, functions on a capacitive basis or also on an inductive basis.

Moreover, the reflector unit may also be elastically pre-stressed to assume the absorber position. In this case, a separate actuator unit is not necessary because the reflector unit is passively driven to assume the absorber position. For example, this may be realized via elastic elements, for example spring elements or the like. In this case it is also possible to deactivate the reflector unit together with the light source, wherein then—due to the no longer available power for the assumption of the operating position—an automatic assumption of the absorber position may be achieved via the elastic pre-stressing.

According to an additional embodiment, it is proposed that the reflector unit have a plurality of adjustable reflector elements that are individually adjustable by means of the control signal. In this embodiment, for example, the reflector unit may be realized as a Digital Micromirror Device (DMD). For example, a DMD is a Spatial Light Modulator (SLM, in German: Flächenmodulator). This is comprised of micromirror actuators arranged like a matrix, meaning that the individual micromirrors are arranged so as to be pivotable. For this, they can be driven by means of a piezoactuator, for example. A length dimension of a micromirror may be in the range of 15 micrometers, for example. Each micromirror can be individually displaced in terms of its angle. Preferably, two stable end states are provided between which the mirror may be adjusted. In this way, an illumination device may also be simultaneously realized by means of the reflector unit in the manner of a pixel headlight. The DMD can particularly be advantageously combined with point light sources, for example a laser (in particular a semiconductor laser) or also an LED (light-emitting diode). It is preferably provided that—in the deactivated state of the light source—the individual reflector elements (the micromirrors, given a DMD) are respectively moved such that a deflection of light to the absorber takes place.

Furthermore, it is proposed that the light source have a laser, an SLD or a light-emitting diode. These light sources are light sources that can provide highly concentrated light in a strongly bundled light beam and especially can interact with the reflector, in particular if it is designed as a reflector unit with a plurality of adjustable reflector elements (such as a DMD). Naturally, this additional optical elements may moreover be provided, for example lenses, additional mirrors or the like. The laser is in particular realized as a semiconductor laser. The SLD (superluminescence diode) is a structural element of the optoelectronics and corresponds in terms of design to a laser semiconductor diode that has no resonator.

Furthermore, it is proposed that a conversion unit be arranged between the light source and the reflector unit. The conversion unit serves to spectrally transform the light emitted by the light source so that light suitable for the illumination purposes is provided. It is hereby preferably white light. A conversion material that is regularly used in conversion units is based on phosphorus. The conversion element is preferably arranged in the beam path between the light source and the reflector unit. The reflector unit therefore does not need to be designed for the properties of the light directly emitted by the light source, but rather may be designed to be adapted to the light emitted by the conversion unit. Moreover—in particular given lasers, SLDs and LEDs—a conversion element with small dimensions may be sufficient in order to be able to realize the desired conversion effect. Moreover, via the method according to the invention or the device according to the invention it may be ensured that, given a deactivated light source, the conversion unit is not charged by light entering from the outside through the light exit aperture. Direct conversion units may react sensitively to such light (in particular if it is sunlight), for example if the conversion material is attached to a substrate of the conversion unit by means of glue and the glue is subject to an increased aging due to the sunlight. Via the invention, light penetrating from the outside through the light exit aperture is deflected to the absorber so that the conversion unit is protected from this.

Additional advantages and features are to be learned from the following description of an exemplary embodiment.

BRIEF DESCRIPTION OF THE SEVERAL VIEWS OF THE DRAWINGS

The single FIGURE shows, in a schematic depiction, an illumination device according to the invention.

DETAILED DESCRIPTION

The single FIGURE shows an illumination device 10 according to the invention that is arranged in a headlight (not shown further) of a motor vehicle (likewise not shown further). The illumination device 10 comprises a light source 12 that is presently designed as a semiconductor laser. The illumination device 10 also comprises a light exit aperture 14 that is presently formed by a glass plate. Arranged between the semiconductor laser 12 and the glass plate 14 is a mirror 16 as a reflector unit whose pivot position is controllable by means of a control signal in order to be controllable with regard to the reflection position. The mirror 16 is designed to assume—by means of an operating control signal as a control signal—an operating position 18 in which the light 20 emitted by the semiconductor laser 12 is reflected such that it is deflected to the glass plate 14.

Also arranged between the semiconductor laser 12 and the mirror 16 is a substrate element with a conversion material (here as phosphor material) as a conversion unit 26. The conversion unit 26 serves to convert the light emitted by the semiconductor laser 12 into white light for illumination purposes. It is not shown that the conversion material is attached by means of a glue layer onto the substrate (not shown). UV light is generated and emitted as emitted light 20 by means of the semiconductor laser 12, which UV light is converted by means of the conversion unit 26 into visible light. As a result of this, the mirror 16 is designed for the reflection of white light as a conversion light.

In the operating position 18 (which is represented by the character +θ), the white light emitted by the conversion unit 26 is deflected by means of the mirror 16 to the glass plate 14 and thereby leaves the illumination device 10 in order to realize a desired illumination function. Since it is presently provided that the illumination device 10 is a component of a motor vehicle headlight, the illumination of a street is provided.

According to the invention, the illumination device 10 comprises an absorber element 22 which is designed to absorb received light. Presently, the absorber element 22 is provided by a black layer on a housing of the illumination device 10 that is designed to absorb white light. For this purpose, the mirror 16 is designed to assume—by means of an absorber signal as a control signal—an absorber position 24 in which the light which is emitted by the conversion unit 26 is deflected to the absorber element 22. This position is also represented by −Θ in the FIGURE. The absorber position 24 is assumed by the mirror 16 when the semiconductor laser 12 is activated.

It is thereby ensured that the semiconductor laser 12, but in particular the conversion unit 26, are not visible from the outside through the glass plate 14. Namely, due to the absorber position of the mirror 16, light entering from the outside through the glass plate 14 is deflected in the direction of the absorber element 22. Such a light is characterized by a light beam 28 in the FIGURE. If the semiconductor laser 12 were still switched in, according to the light beam 28 light would accordingly be deflected to the absorber element 22.

In any case, it is ensured that the optical connection between the semiconductor laser 12 or the conversion unit 26 and the glass plate 14 is interrupted. The conversion unit 26 may thereby be reliably protected against light entering from the outside through the glass plate, such that in particular an aging of the glue bond between the phosphor and the substrate unit may be reduced.

It is simultaneously achieved that the illumination device 10 no longer glows yellow when viewed from the outside, through the glass plate 14, because—via the mirror 16 in the absorber position 24—it is ensured that the optical connection is interrupted. In the absorber position 24 of the mirror 16, light entering from the outside is likewise deflected to the absorber element 22. This is represented by the light beam 30 in the FIGURE.

The exemplary embodiment merely serves for the explanation of the invention and is not limited to this. Naturally, functions (in particular with regard to the reflector unit and its actuator) may vary without leaving the ideas of the invention. Moreover, the invention is not limited only to use in vehicles, but rather can naturally be used for any illumination devices, for example also building illumination devices or the like.

Finally, it is to be noted that the advantages and features, as well as embodiments, that are described for the device according to the invention similarly apply to the corresponding method, and vice versa. In particular, corresponding method features may be provided for device features, and vice versa.

The invention claimed is:

1. An illumination device, comprising:
   a light source;
   a light exit aperture;
   an absorber element configured to absorb light; and
   a reflector unit that is arranged between the light source and the light exit aperture,
   wherein the reflector unit is configured to receive an operating control signal and is configured to assume, in response to receipt of the operating control signal, an operating position in which light emitted by the light source is reflected by the reflector unit to the light exit aperture, and
   wherein the reflector unit is configured to receive an absorber control signal and is configured to assume, in response to receipt of the absorber control signal, an absorber position in which the light emitted by the light source is reflected by the reflector unit to the absorber element and light entering into the illumination device from outside of the illumination device through the light exit aperture is reflected by the reflector unit to the absorber element.

2. The illumination device according to claim 1, wherein the reflector unit is configured to automatically assume the absorber position when the light source is deactivated.

3. The illumination device according to claim 2, wherein the reflector unit is configured to be driven into the absorber position by an actuator unit.

4. The illumination device according to claim 2, wherein the reflector unit is elastically pre-stressed to assume the absorber position.

5. The illumination device according to claim 1, wherein the reflector unit has a plurality of adjustable reflector elements that are individually adjustable.

6. The illumination device according to claim 1, wherein the light source has a laser, an SLD or a light-emitting diode.

7. The illumination device according to claim 1, wherein a conversion unit is arranged between the light source and the reflector unit.

8. A headlight for a motor vehicle, the headlight having a headlight housing, an electrical connection unit, and an illumination device, the illumination device comprising:
- a light source;
- a light exit aperture;
- an absorber element configured to absorb light; and
- a reflector unit that is arranged between the light source and the light exit aperture,
- wherein the reflector unit is configured to receive an operating control signal and is configured to assume, in response to receipt of the operating control signal, an operating position in which light emitted by the light source is reflected by the reflector unit to the light exit aperture,
- wherein the reflector unit is configured to receive an absorber control signal and is configured to assume, in response to receipt of the absorber control signal, an absorber position in which the light emitted by the light source is reflected by the reflector unit to the absorber element and light entering into the illumination device from outside of the illumination device through the light exit aperture is reflected by the reflector unit to the absorber element, and
- wherein the reflector unit is configured to automatically assume the absorber position when the light source is deactivated.

9. A motor vehicle including a headlight, the headlight having a headlight housing, an electrical connection unit, and an illumination device, the illumination device comprising:
- a light source;
- a light exit aperture;
- an absorber element configured to absorb light; and
- a reflector unit that is arranged between the light source and the light exit aperture,
- wherein the reflector unit is configured to receive an operating control signal and is configured to assume, in response to receipt of the operating control signal, an operating position in which light emitted by the light source is reflected by the reflector unit to the light exit aperture,
- wherein the reflector unit is configured to receive an absorber control signal and is configured to assume, in response to receipt of the absorber control signal, an absorber position in which the light emitted by the light source is reflected by the reflector unit to the absorber element and light entering into the illumination device from outside of the illumination device through the light exit aperture is reflected by the reflector unit to the absorber element,
- wherein the reflector unit is configured to automatically assume the absorber position when the light source is deactivated, and
- wherein the reflector unit is elastically pre-stressed to assume the absorber position.

* * * * *